(12) United States Patent
Abotabl et al.

(10) Patent No.: US 11,706,802 B2
(45) Date of Patent: Jul. 18, 2023

(54) WIRELESS COMMUNICATION USING MULTIPLE LISTEN BEFORE TALK (LBT) THRESHOLD VALUES

(71) Applicant: QUALCOMM Incorporated, San Diego, CA (US)

(72) Inventors: Ahmed Attia Abotabl, San Diego, CA (US); Giovanni Chisci, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/305,829

(22) Filed: Jul. 15, 2021

(65) Prior Publication Data

US 2022/0095373 A1 Mar. 24, 2022

Related U.S. Application Data

(60) Provisional application No. 63/081,798, filed on Sep. 22, 2020.

(51) Int. Cl.
| | | |
|---|---|---|
| *H04W 74/08* | (2009.01) | |
| *H04W 72/04* | (2023.01) | |
| *H04W 72/23* | (2023.01) | |
| *H04W 72/0453* | (2023.01) | |

(52) U.S. Cl.
CPC ... *H04W 74/0808* (2013.01); *H04W 72/0453* (2013.01); *H04W 72/23* (2023.01)

(58) Field of Classification Search
CPC .......... H04W 74/0808; H04W 72/042; H04W 72/0453
See application file for complete search history.

(56) References Cited

U.S. PATENT DOCUMENTS

| | | | |
|---|---|---|---|
| 10,375,579 B2* | 8/2019 | Li | ......................... H04L 5/0044 |
| 2010/0260138 A1* | 10/2010 | Liu | ....................... H04L 5/0023 |

\* cited by examiner

*Primary Examiner* — Ronald B Abelson
(74) *Attorney, Agent, or Firm* — Norton Rose Fulbright US LLP/Qualcomm Incorporated

(57) ABSTRACT

A method of wireless communication includes receiving, by a user equipment (UE) from a base station, a control message associated with a plurality of listen before talk (LBT) threshold values including a first LBT threshold value and a second LBT threshold value. The first LBT threshold value is associated with a first frequency spectrum, and the second LBT threshold value is associated with a second frequency spectrum different than the first frequency spectrum. The method further includes performing an LBT operation based on the first LBT threshold value and the second LBT threshold value. The method further includes, based on the LBT operation, performing a transmission by the UE using one or both of the first frequency spectrum or the second frequency spectrum.

30 Claims, 8 Drawing Sheets

WIRELESS COMMUNICATION USING MULTIPLE LISTEN BEFORE TALK (LBT) THRESHOLD VALUES

CROSS-REFERENCE TO RELATED APPLICATIONS

This application claims the benefit of U.S. Prov. Pat. App. No. 63/081,798, entitled "WIRELESS COMMUNICATION USING MULTIPLE LISTEN BEFORE TALK (LBT) THRESHOLD VALUES" and filed on Sep. 22, 2020, which is expressly incorporated by reference herein in its entirety.

TECHNICAL FIELD

Aspects of the present disclosure relate generally to wireless communication systems, and more particularly, to wireless communication systems that perform listen before talk (LBT) operations.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving, by a user equipment (UE) from a base station, a control message associated with a plurality of listen before talk (LBT) threshold values including a first LBT threshold value and a second LBT threshold value. The first LBT threshold value is associated with a first frequency spectrum, and the second LBT threshold value is associated with a second frequency spectrum different than the first frequency spectrum. The method further includes performing an LBT operation based on the first LBT threshold value and the second LBT threshold value. The method further includes, based on the LBT operation, performing a transmission by the UE using one or both of the first frequency spectrum or the second frequency spectrum.

In some other aspects of the disclosure, an apparatus includes a receiver configured to receive, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes a transmitter configured to initiate a transmission using one or both of the first frequency spectrum or the second frequency spectrum. The transmission is based on an LBT operation that is based on the first LBT threshold value and the second LBT threshold value.

In some other aspects of the disclosure, a method of wireless communication includes transmitting, by a base station to a UE, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The method further includes receiving, from the UE, a transmission using one or both of the first frequency spectrum or the second frequency spectrum. The transmission is based on an LBT operation that is based on the first LBT threshold value and the second LBT threshold value.

In some other aspects of the disclosure, an apparatus includes a transmitter configured to transmit, to a UE, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes a receiver configured to receive, from the UE, a transmission using one or both of the first frequency spectrum or the second frequency spectrum. The transmission is based on an LBT operation that is based on the first LBT threshold value and the second LBT threshold value.

In some other aspects of the disclosure, a non-transitory computer-readable medium stores instructions executable by a processor to perform operations. The operations include receiving, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The operations further include performing an LBT operation based on the first LBT threshold value and the second LBT threshold value. The operations further include, based on the LBT operation, initiating a transmission using one or both of the first frequency spectrum or the second frequency spectrum.

In some other aspects of the disclosure, an apparatus includes a memory and one or more processors coupled to the memory. The one or more processors are configured to receive, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The one or more processors are further configured to perform an LBT operation based on the first LBT threshold value and the second LBT threshold value and to initiate, based on the LBT operation, a transmission using one or both of the first frequency spectrum or the second frequency spectrum.

In some other aspects of the disclosure, an apparatus includes means for receiving, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes means for performing an LBT operation based on the first LBT threshold value and the second LBT threshold value and means for performing, based on the LBT operation, a transmission using one or both of the first frequency spectrum or the second frequency spectrum.

In some other aspects of the disclosure, a method of wireless communication includes determining, by a base station, that a first frequency spectrum is available for communication. The method further includes determining, by the base station, that a second frequency spectrum is available for communication. The second frequency spectrum is different than the first frequency spectrum. The method further includes transmitting, by the base station to a UE, a control message associated with a plurality of LBT threshold values including a first LBT threshold value and a second LBT threshold value. The first LBT threshold value is associated with the first frequency spectrum, and the second LBT threshold value is associated with the second frequency spectrum.

In some other aspects of the disclosure, a non-transitory computer-readable medium stores instructions executable by a processor to perform operations. The operations include determining that a first frequency spectrum is available for communication and determining that a second frequency spectrum is available for communication. The second frequency spectrum is different than the first frequency spectrum. The operations further include initiating transmission, to a UE, of a control message associated with a plurality of LBT threshold values including a first LBT threshold value and a second LBT threshold value. The first LBT threshold value is associated with the first frequency spectrum, and the second LBT threshold value is associated with the second frequency spectrum.

In some other aspects of the disclosure, an apparatus includes a memory and one or more processors coupled to the memory. The one or more processors are configured to determine that a first frequency spectrum is available for communication and to determine that a second frequency spectrum is available for communication. The second frequency spectrum is different than the first frequency spectrum. The one or more processors are further configured to initiate transmission, to a UE, of a control message associated with a plurality of LBT threshold values including a first LBT threshold value and a second LBT threshold value. The first LBT threshold value is associated with the first frequency spectrum, and the second LBT threshold value is associated with the second frequency spectrum.

In some other aspects of the disclosure, an apparatus includes means for determining that a first frequency spectrum is available for communication and for determining that a second frequency spectrum is available for communication, wherein the second frequency spectrum is different than the first frequency spectrum. The apparatus further includes means for transmitting, a UE, a control message associated with a plurality of LBT threshold values including a first LBT threshold value and a second LBT threshold value. The first LBT threshold value is associated with the first frequency spectrum, and the second LBT threshold value is associated with the second frequency spectrum.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
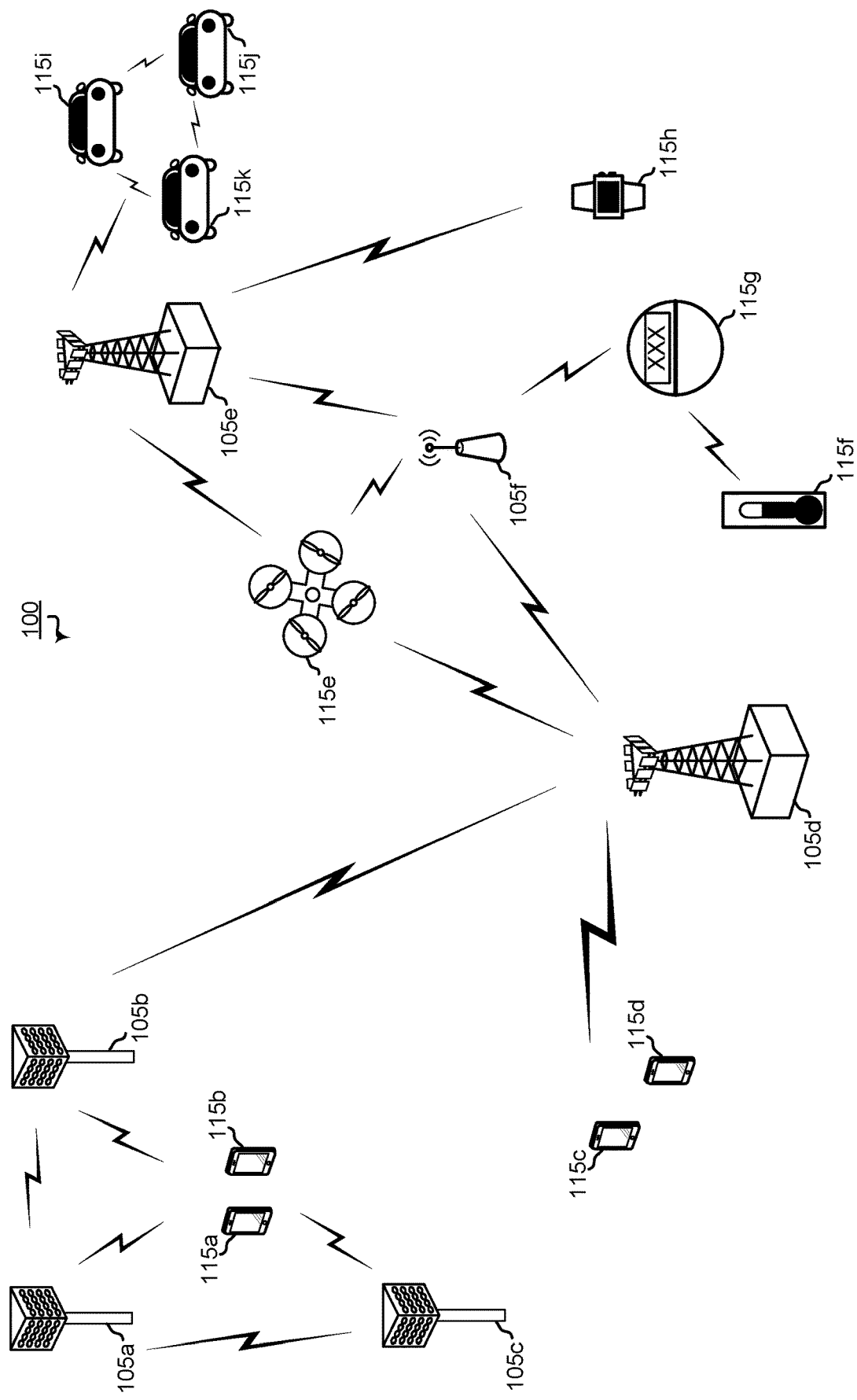
FIG. 1 is a block diagram illustrating an example of a wireless communication system that supports wireless communication using multiple listen before talk (LBT) threshold values according to some aspects of the disclosure.

Some communication systems share frequencies with neighboring communication systems of different technologies. For example, a fifth generation new radio (5G NR) communication system may share an unlicensed band (such as a 5 gigahertz (GHz) frequency band or a 6 GHz frequency band) with a WiFi communication network. To reduce or avoid interference due to WiFi transmissions, the 5G NR communication system may a listen before talk (LBT) operation to sense whether the unlicensed band is available prior to initiating a transmission using the unlicensed band. The LBT operation may succeed (and the transmission may be performed) if an amount of detected energy associated with the unlicensed band fails to satisfy an LBT threshold. In some other cases, the LBT operation may fail (and the transmission may be avoided or delayed) if the amount of detected energy satisfies the LBT threshold.

In some cases, the LBT threshold may affect throughput or communication quality. For example, in some cases, an LBT threshold for the LBT operation may be too "restrictive" (reducing a number of transmissions via the unlicensed band and reducing throughput). In some other cases, an LBT threshold may be too "relaxed" (increasing throughput but potentially causing interference and dropped packets).

A wireless communication in accordance with some aspects of the disclosure may use independently configurable LBT thresholds for multiple different frequency spectrums of an unlicensed band. In some cases, use of independently configurable LBT thresholds may enable the LBT thresholds to be dynamically determined based on the particular conditions in a wireless communication system. For example, due to dynamic scheduling, a communication using a frequency spectrum of an unlicensed band may dynamically change from a downlink transmission to an uplink transmission (or vice versa). By rescheduling from the downlink transmission to the uplink transmission, the communication may be subject to downlink-uplink "leakage" from another downlink communication that utilizes an adjacent frequency band. As a result, by independently selecting an LBT threshold for the communication, the LBT threshold may compensate for the downlink-uplink leakage (and reducing or avoiding instances where the LBT threshold is too "restrictive" or too "relaxed").

To further illustrate, one or more aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs that support wireless communication using multiple LBT threshold values according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
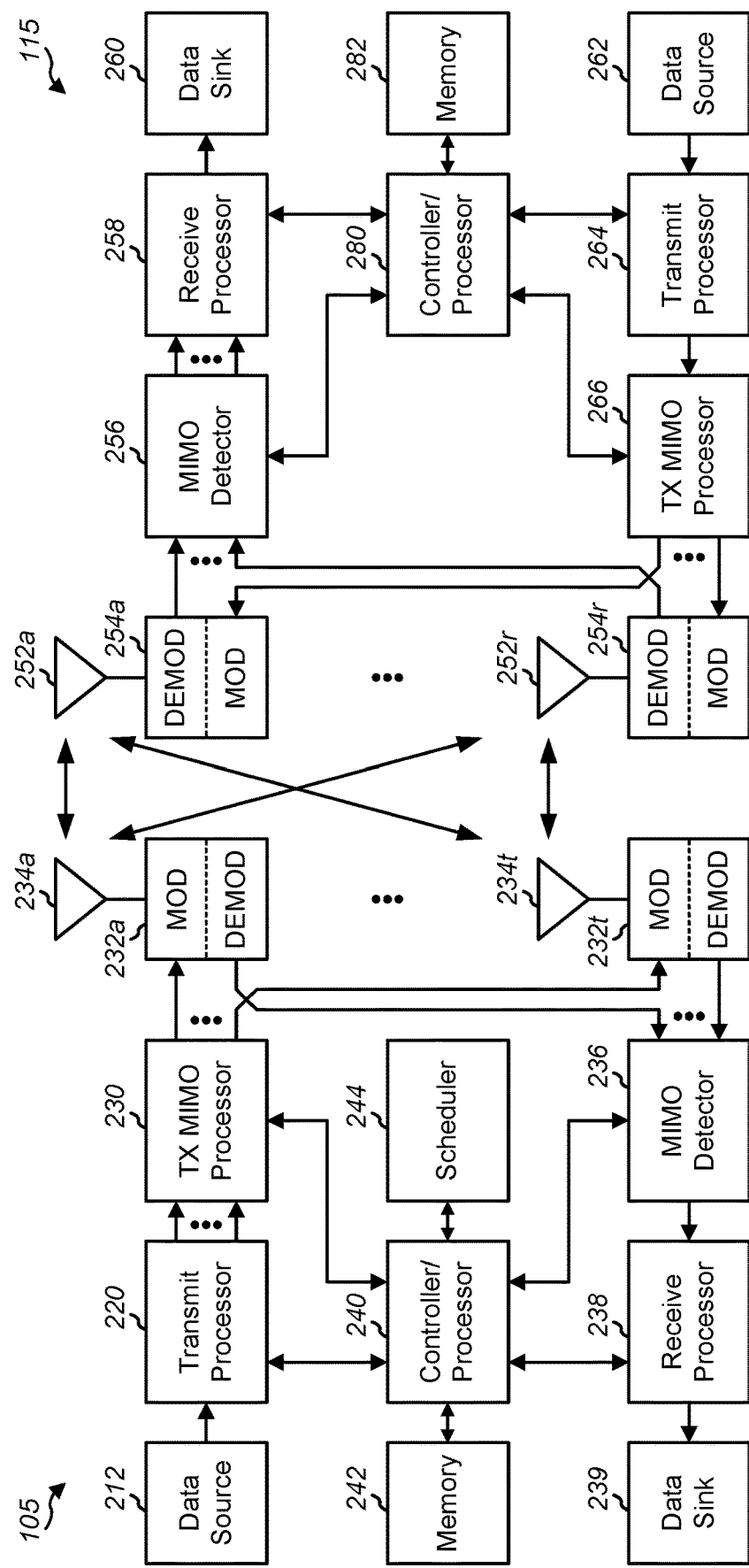
FIG. 2 is a block diagram illustrating examples of a base station and a UE that support wireless communication using multiple LBT threshold values according to some aspects of the disclosure.

FIG. 2 shows a block diagram of a design of a base station 105 and a UE 115, which may be one of the base station and one of the UEs in FIG. 1, that support wireless communication using multiple LBT threshold values according to some aspects of the disclosure. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein, such as the operations illustrated in FIG. 8. The controllers/processor 280 and/or other processors and modules at the UE 115 may also perform or control the operations illustrated in FIG. 7 and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
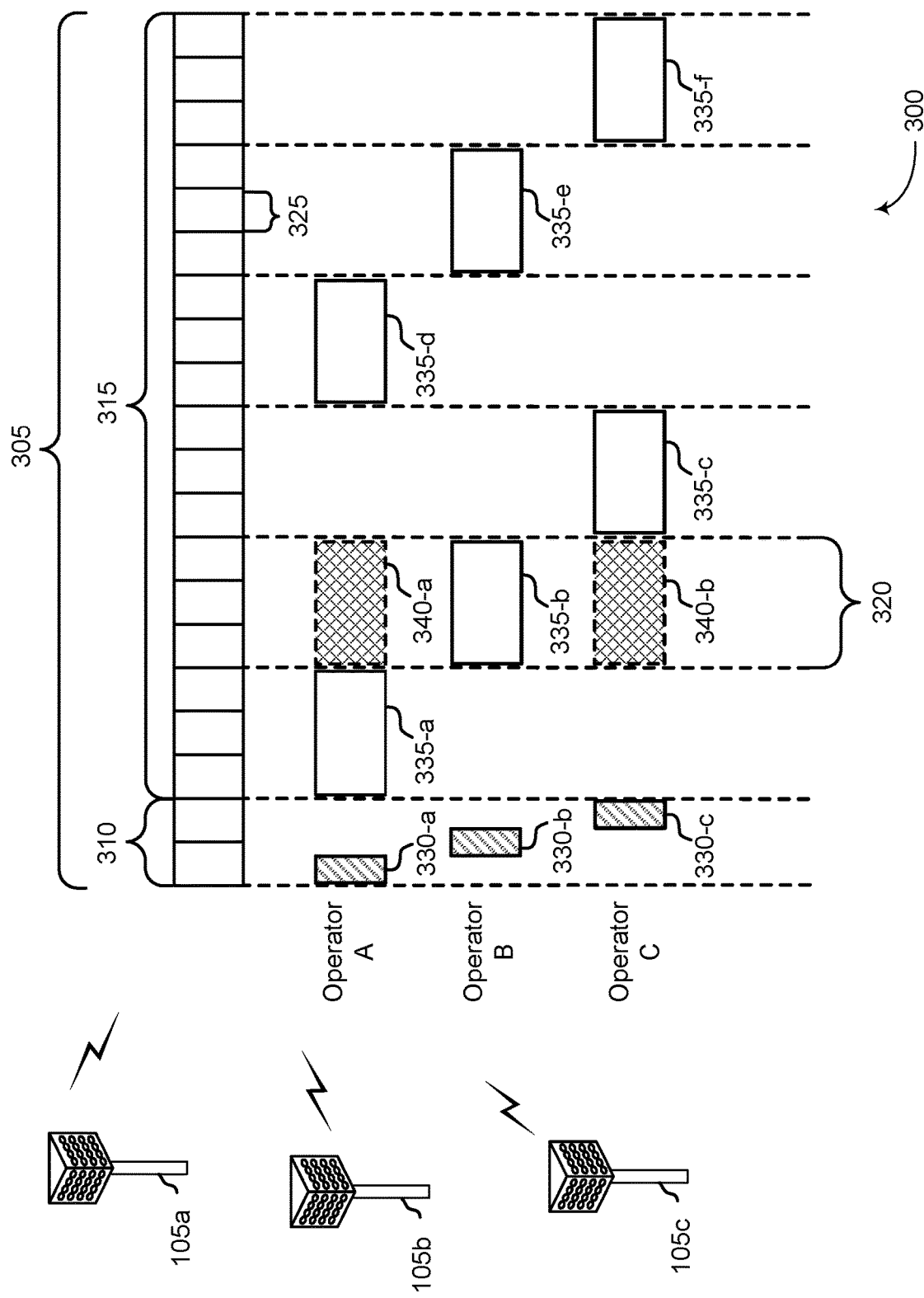
FIG. 3 is a block diagram illustrating an example of a wireless communication system including base stations that use directional wireless beams and that support wireless communication using multiple LBT threshold values according to some aspects of the disclosure.

FIG. 3 illustrates an example of a timing diagram 300 for coordinated resource partitioning that supports wireless communication using multiple LBT threshold values according to some aspects of the disclosure. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305.

This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some examples, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
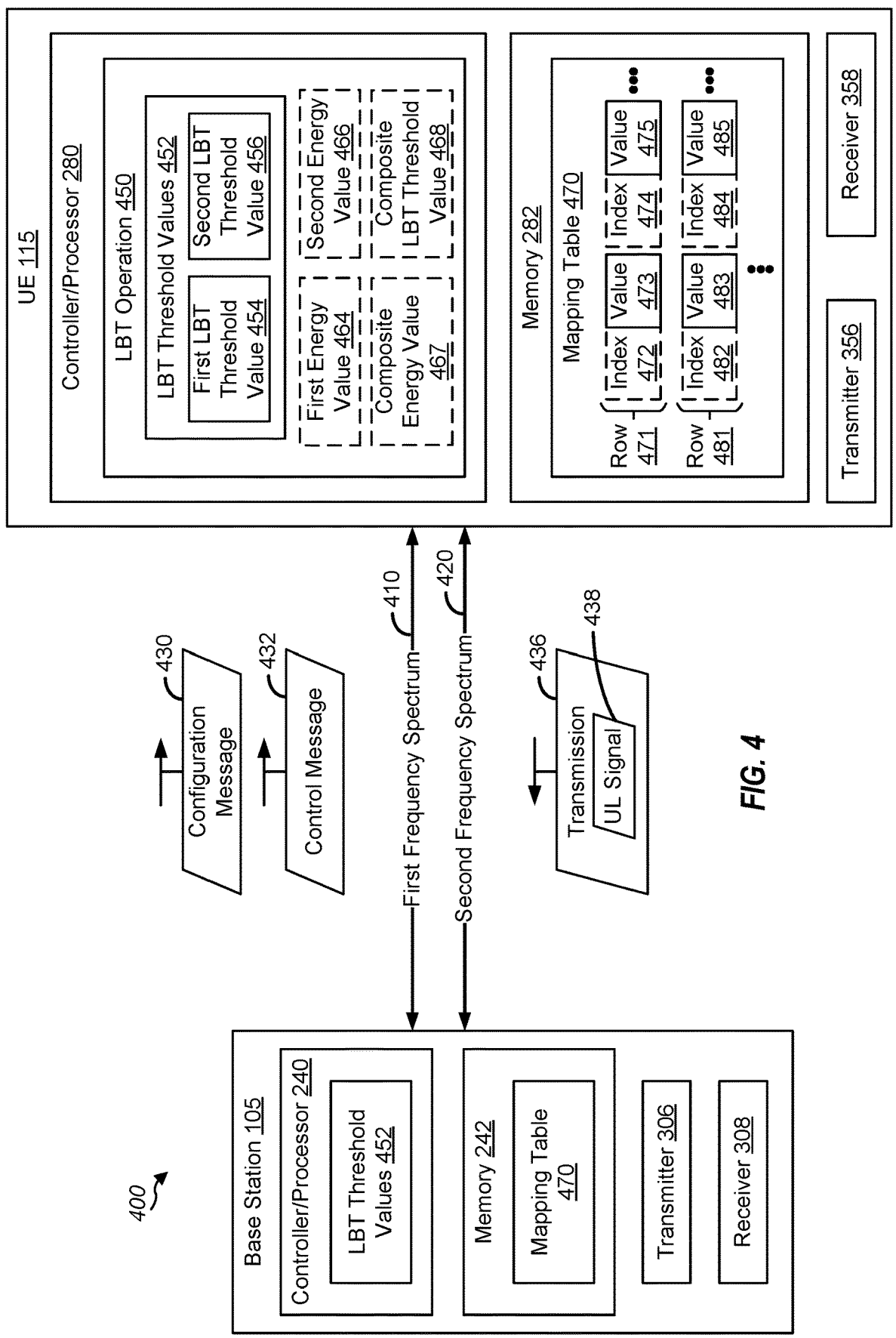
FIG. 4 is a block diagram illustrating another example of a wireless communication system that supports wireless communication using multiple LBT threshold values according to some aspects of the disclosure.

FIG. 4 is a block diagram illustrating an example of a wireless communication system 400 that supports wireless communication using multiple LBT threshold values according to some aspects of the disclosure. The wireless communication system 400 may include one or more base stations, such as the base station 105, and may include one or more UEs, such as the UE 115.

The example of FIG. 4 illustrates that the base station 105 may include one or more processors (such as the controller/processor 240) and may include the memory 242. The base station 105 may further include a transmitter 306 and a receiver 308. The controller/processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

FIG. 4 also illustrates that the UE 115 may include one or more processors (such as the controller/processor 280), a memory (such as the memory 282), a transmitter 356, and a receiver 358. The controller/processor 280 may be coupled to the memory 282, to the transmitter 356, and to the receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may be configured to transmit reference signals, synchronization signals, control information, and data to one or more other devices, and the receiver 358 may be configured to receive reference signals, control information, and data from one or more other devices. For example, in some implementations, the transmitter 356 may be configured to transmit signaling, control information, and data to the base station 105, and the receiver 358 may be configured to receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 400 operates in accordance with a 5G NR network. For example, the wireless communication system 400 may include multiple 5G-capable UEs 115 and multiple 5G-capable base stations 105, such as UEs and base stations configured to operate in accordance with a 5G NR network protocol such as that defined by the 3GPP.

During operation, the base station 105 and the UE 115 may communicate using a first frequency spectrum 410 and a second frequency spectrum 420. One or both of the frequency spectrums 410, 420 may be included in an unlicensed spectrum, such as a 5 gigahertz (GHz) unlicensed spectrum or a 6 GHz unlicensed spectrum, as illustrative examples. In some examples, the frequency spectrums 410, 420 may be associated with one or more features described with reference to FIG. 3. For example, one or both of the frequency spectrums 410, 420 may be accessed on an opportunistic basis, such as described with reference to the sub-interval 320 of FIG. 3.

In some implementations, the base station 105 configures to the UE 115 to use the first frequency spectrum 410 and the second frequency spectrum 420. For example, the base station 105 may determine that the first frequency spectrum 410 and the second frequency spectrum 420 are available for communication (e.g., based on success of one or more LBT operations). Based on determining that the first frequency spectrum 410 and the second frequency spectrum 420 are available for communication, the base station 105 may transmit to the UE 115 a control message 432 associated with LBT threshold values 452. The LBT threshold values 452 may include a first LBT threshold value 454 (e.g., a bandwidth-specific LBT threshold value) associated with the first frequency spectrum 410 and a second LBT threshold value 456 (e.g., another bandwidth-specific LBT threshold value) associated with the second frequency spectrum 420. In some implementations, the control message 432 may have one of a downlink control information (DCI) 2_0 format, a radio resource control (RRC) format, or a medium access control (MAC) control element (MAC-CE) format. In some examples, the UE 115 selects the LBT threshold values 454, 456 from a mapping table 470 of index values to LBT threshold values based on the control message 432.

In one example, the UE 115 selects the values from the mapping table 470 on a per-row basis based on a particular index value (e.g., a single index value) indicated by the control message 432. In this example, the control message 432 may indicate an index value that corresponds to a particular row of the mapping table 470, and the UE 115 may use the index value as a lookup to the particular row to determine the LBT threshold values 454, 456. To illustrate, the mapping table may include a first row 471 and a second row 481. The first row 471 may include an LBT threshold value 473 associated with the first frequency spectrum 410 and an LBT threshold value 475 associated with the second frequency spectrum 420, and the second row 481 may include an LBT threshold value 483 associated with the first frequency spectrum 410 and an LBT threshold value 485 associated with the second frequency spectrum 420. In some examples, the control message 432 indicates a first index value associated with the first row 471, and the UE 115 selects the LBT threshold values 473, 475 based on the control message 432. In this case, the LBT threshold values 454, 456 may correspond to the LBT threshold values 473, 475, respectively. In some other examples, the control message 432 indicates a second index value associated with the second row 481, and the UE 115 selects the LBT threshold values 483, 485 based on the control message 432.

In this case, the LBT threshold values 454, 456 may correspond to the LBT threshold values 483, 485, respectively.

In some other examples, the control message 432 may individually identify each of the LBT threshold values 452 on an per-value basis (instead of on a per-row basis). In this case, the control message 432 may include multiple index values that individually indicate LBT threshold values of the mapping table 470 (instead of including a single index value that indicates a particular row of the mapping table 470). To illustrate, the mapping table 470 may include an index value 472 associated with the LBT threshold value 473, an index value 474 associated with the LBT threshold value 475, an index value 482 associated with the LBT threshold value 483, and an index value 484 associated with the LBT threshold value 485. The control message 432 may include a first index value corresponding to one of the index values 472, 474, 482, and 484 and may further include a second index value corresponding to another of the index values 472, 474, 482, and 484. The UE 115 may access the mapping table 470 to determine the first LBT threshold value 454 based on the first index value and to determine the second LBT threshold value 456 based on the second index value.

In some examples, the first index value includes a first number of bits, and the second index value includes a second number of bits. The base station 105 may independently determine the first number of bits and the second number of bits to indicate a first resolution associated with the first LBT threshold value 454 and to indicate a second resolution associated with the second LBT threshold value 456, respectively. As a non-limiting illustrative example, the mapping table 470 may indicate that the LBT threshold value 472 has a value of 72.123 decibels relative to one milliwatt (dBm), and the control message 432 may represent the index value 472 using the first number of bits. If the first number of bits indicates that the first resolution is two significant digits, then the first LBT threshold value 454 may correspond to 72 dBm. If the first number of bits indicates that the first resolution is three significant digits, then the first LBT threshold value 454 may correspond to 72.1 dBm. If the first number of bits indicates that the first resolution is four significant digits, then the first LBT threshold value 454 may correspond to 72.12 dBm.

In some implementations, the base station 105 (or another network device) provides the mapping table 470 to the UE 115. For example, the base station 105 may transmit a configuration message 430 to the UE 115 indicating the mapping table 470. The configuration message 430 may dynamically configure the UE 115 with the mapping table 470 and may be used to update the mapping table 470 dynamically duration operation of the wireless communication system 400. The configuration message 430 may have an RRC format, as an illustrative example. In some other examples, the base station 105 and the UE 115 operate based on a wireless communication protocol that specifies the mapping table 470. In some examples, the UE 115 is provisioned with the mapping table 470 by a manufacturer of the UE 115.

After determining the LBT threshold values 452 based on the control message 432, the UE 115 may perform one or more LBT operations based on the LBT threshold values 452, such as an LBT operation 450. For example, the UE 115 may sense the first frequency spectrum 410 to determine a first energy value 464 associated with signals, noise, or interference sensed via the first frequency spectrum 410 and may sense the second frequency spectrum 420 to determine a second energy value 466 associated with signals, noise, or interference sensed via the second frequency spectrum 420.

Depending on the particular implementation, the UE 115 may sense the first frequency spectrum 410 concurrently (e.g., using multiple receive paths of the UE 115), partially concurrently, or sequentially (e.g., using a single receive path of the UE 115) with sensing the second frequency spectrum 420.

In some examples, performing the LBT operation 450 may include comparing the first energy value 464 to the first LBT threshold value 454 to determine whether the first energy value 464 satisfies (e.g., exceeds) the first LBT threshold value 454. Based on the first energy value 464 failing to satisfy the first LBT threshold value 454, the UE 115 may determine that the first frequency spectrum 410 is available for a transmission 436. In some other examples, the first energy value 464 may satisfy the first LBT threshold value 454, and the UE 115 may determine that the first frequency spectrum 410 is unavailable. The LBT operation 450 may also include comparing the second energy value 466 to the second LBT threshold value 456 to determine whether the second energy value 466 satisfies (e.g., exceeds) the second LBT threshold value 456. Based on the second energy value 466 failing to satisfy the second LBT threshold value 456, the UE 115 may determine that the second frequency spectrum 420 is available for the transmission 436 (or another transmission). In some other examples, the second energy value 466 may satisfy the second LBT threshold value 456, and the UE 115 may determine that the second frequency spectrum 420 is unavailable.

In some examples, the first LBT threshold value 454 is different than the second LBT threshold value 456. If the transmission 436 is to include transmitting an uplink signal 438 using both the first frequency spectrum 410 and the second frequency spectrum 420, then a circumstance may occur in which the first frequency spectrum 410 is available and the second frequency spectrum 420 is unavailable (or vice versa). In one example, the UE 115 determines success of the LBT operation 450 on a collective basis (e.g., based on determining that each of the LBT threshold values 452 is not satisfied). For example, if the UE 115 determines that the first energy value 464 fails to satisfy the first LBT threshold value 454 and that the second energy value 466 fails to satisfy the second LBT threshold value 456, then the UE 115 may determine success of the LBT operation 450. In this case, the UE 115 may perform the transmission 436 of the uplink signal 438 using both the first frequency spectrum 410 and the second frequency spectrum 420. In some other examples, the UE 115 may determine that the first energy value 464 satisfies the first LBT threshold value 454, that the second energy value 466 satisfies the second LBT threshold value 456 or both. In this case, the UE 115 may determine failure of the LBT operation 450 and may decline (or delay) performance of the transmission 436.

In another example, the LBT operation 450 may include determining a composite energy value 467 associated with both the first frequency spectrum 410 and the second frequency spectrum 420 and may further include determining a composite LBT threshold value 468 based on the LBT threshold values 452. In some examples, the UE 115 sums the energy values 464, 466 to determine the composite energy value 467 or senses the frequency spectrums 410, 420 collectively to determine the composite energy value 467. The UE 115 may determine success of the LBT operation 450 based on the composite energy value 467 failing to satisfy the composite LBT threshold value 468 or may determine failure of the LBT operation 450 based on the composite energy value 467 satisfying the composite LBT threshold value 468.

In some examples, the UE 115 may determine the composite LBT threshold value by identifying a maximum value of the LBT threshold values 452 and may select the maximum value as the composite LBT threshold value 468. As an example, if the first LBT threshold value 454 is greater than the second LBT threshold value 456, then the UE 115 may select the first LBT threshold value 454 as the composite LBT threshold value 468. As another example, if the second LBT threshold value 456 is greater than the first LBT threshold value 454, then the UE 115 may select the second LBT threshold value 456 as the composite LBT threshold value 468.

In some other examples, the UE 115 may determine the composite LBT threshold value by identifying a minimum value of the LBT threshold values 452 and may select the minimum value as the composite LBT threshold value 468. As an example, if the first LBT threshold value 454 is less than the second LBT threshold value 456, then the UE 115 may select the first LBT threshold value 454 as the composite LBT threshold value 468. As another example, if the second LBT threshold value 456 is less than the first LBT threshold value 454, then the UE 115 may select the second LBT threshold value 456 as the composite LBT threshold value 468.

In another example, composite LBT threshold value 468 may correspond to an average of the LBT threshold values 452. Depending on the particular implementation, the average of the LBT threshold values 452 may refer to an arithmetic mean of the LBT threshold values 452, a geometric mean of the LBT threshold values 452, a harmonic mean of the LBT threshold values 452, a median value of the LBT threshold values 452, a mode value of the LBT threshold values 452, or another type of average of the LBT threshold values 452. In some other examples, determining the composite LBT threshold value 468 may include performing one or more operations based on another particular function of the plurality of LBT threshold values 452.

In another example, the composite LBT threshold value 468 corresponds to a predetermined LBT threshold value that is reserved for LBT operations associated with multiple different LBT threshold values. For example, the base station 105 may indicate the predetermined LBT threshold value to the UE 115 using the configuration message 430 or the control message 432, and the UE 115 may use the predetermined LBT threshold value in connection with the LBT operation 450 based on determining that the first LBT threshold value 454 differs from the second LBT threshold value 456.

Figure 5:
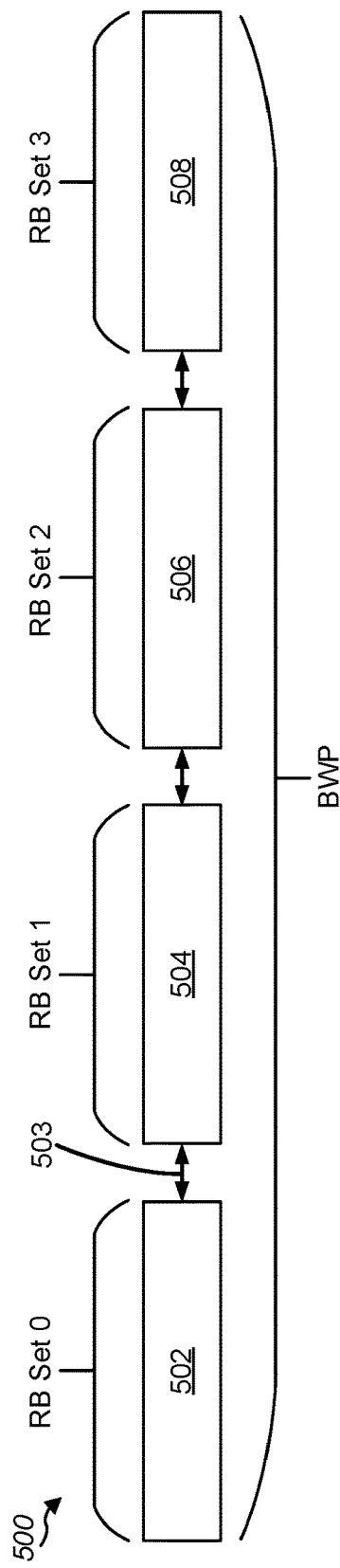
FIG. 5 is a block diagram illustrating an example of a bandwidth part (BWP) that supports wireless communication using multiple LBT threshold values according to some aspects of the disclosure.

FIG. 5 is a block diagram illustrating an example of a bandwidth part (BWP) 500 that supports wireless communication using multiple LBT threshold values according to some aspects of the disclosure. In FIG. 5, the abscissa may indicate frequency. The BWP 500 may include a first resource block (RB) set 502, a second RB set 504, a third RB set 506, and a fourth RB set 508. In some examples, RB sets of the BWP 500 may be separated by a guard band, such as a representative guard band 503 separating the first RB set 502 and the second RB set 504.

In some examples, each of the RB sets 502, 504, 506, and 508 corresponds to a respective channel access unit that is used (or accessible to) devices of another wireless communication network that is different than the wireless communication system 400 of FIG. 4. As an illustrative example, each of the RB sets 502, 504, 506, and 508 may correspond to a respective 20 megahertz (MHz) WiFi channel access unit that is used (or accessible to) WiFi devices of a WiFi communication network. To avoid interference or resource conflicts, devices of the wireless communication system 400 of FIG. 4 may perform LBT operations (such as the LBT operation 450) prior to using the RB sets 502, 504, 506, and 508. Further, the RB sets 502, 504, 506, and 508 may be referred to as LBT bandwidths.

In some implementations, an LBT threshold value may be associated with a respective LBT bandwidth (e.g., on a one-to-one basis). To illustrate, the first frequency spectrum 410 of FIG. 4 may be associated with one of the RB sets 502, 504, 506, and 508 (e.g., the first RB set 502), and the second frequency spectrum 420 of FIG. 4 may be associated with another of the RB sets 502, 504, 506, and 508 (e.g., the second RB set 504). In this case, the first frequency spectrum 410 of FIG. 4 may include frequencies of the first RB set 502, and the second frequency spectrum 420 of FIG. 4 may include frequencies of the second RB set 504. Alternatively or in addition, an LBT threshold value may be associated with multiple LBT bandwidths (e.g., on a one-to-many basis). For example, the first frequency spectrum 410 of FIG. 4 may be associated with multiple RB sets of the RB sets 502, 504, 506, and 508 (e.g., the RB sets 502 and 504), and the second frequency spectrum 420 of FIG. 4 may be associated with multiple other RB sets of the RB sets 502, 504, 506, and 508 (e.g., the RB sets 506 and 508). In this case, the first frequency spectrum 410 of FIG. 4 may include frequencies of the RB sets 502 and 504, and the second frequency spectrum 420 of FIG. 4 may include frequencies of the RB sets 506 and 508.

Although certain examples of FIGS. 4 and 5 describe two frequency spectrums 410 and 420, two LBT threshold values 454 and 456, and four RB sets 502, 504, 506, and 508, it is noted that other examples are also within the scope of the disclosure. For example, three or more frequency spectrums and three or more LBT threshold values may be used. As another example, two RB sets, three RB sets, or five or more RB sets may be included in the BWP 500 of FIG. 5.

In some cases, the base station 105 of FIG. 4 may determine that a third frequency spectrum is unavailable for communication, and the LBT threshold values 452 may exclude any LBT threshold value associated with the third frequency spectrum. To illustrate, if the base station 105 determines that frequencies of the third RB set 506 are unavailable for communication, then the base station 105 may exclude any LBT threshold value associated with the third RB set 506 from the LBT threshold values 452 (which may prevent the UE 115 from expending power and resources attempting to communicate using the third frequency spectrum).

Figure 6:
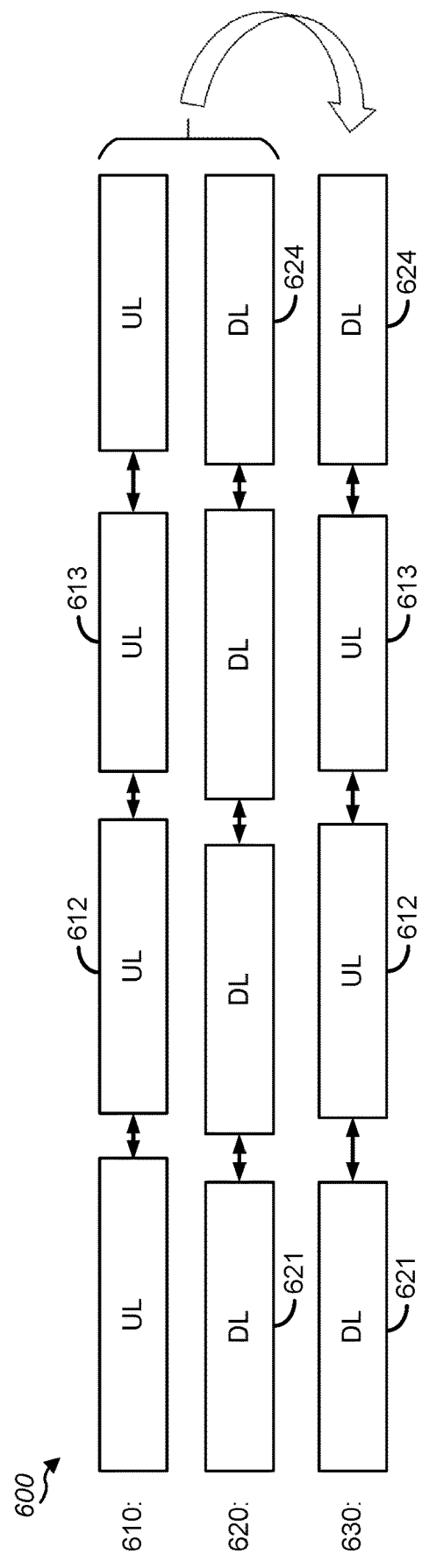
FIG. 6 is a block diagram illustrating examples of transmission schemes that may be associated with resource block (RB) sets of the BWP of FIG. 5 to support wireless communication using multiple LBT threshold values according to some aspects of the disclosure.

FIG. 6 is a block diagram illustrating examples of transmission schemes 600 that may be associated with the RB sets of the BWP 500 of FIG. 5 to support wireless communication using multiple LBT threshold values according to some aspects of the disclosure. The transmission schemes 600 may include a first transmission scheme 610, a second transmission scheme 620, and a third transmission scheme 630. In some examples, the base station 105 schedules the third transmission scheme 630 dynamically, such as by combining uplink transmissions 612, 613 of the first transmission scheme 610 with downlink transmissions 621, 624 of the second transmission scheme 620. In some examples, the UE 115 receives downlink communications from the base station 105 via the downlink transmissions 621, 624 using the RB sets 502, 508 and transmits uplink signals (such as the uplink signal 438) to the base station 105 via the uplink transmissions 612, 613 using the RB sets 504, 506.

In some implementations, uplink transmissions of the first transmission scheme 610 may include a first number of frequency resources, and downlink transmissions of the second transmission scheme 620 may include a second number of frequency resources different than the first number. In some examples, the first number is greater than the second number (e.g., as shown in the example of FIG. 6, where uplink transmissions of the first transmission scheme 610 are illustrated as being wider than downlink transmissions of the second transmission scheme 620). In some implementations, a guard band separating uplink transmissions of the first transmission scheme 610 may be narrower (and may include fewer frequency resources) than a guard band separating downlink transmissions of the second transmission scheme 620. After combining the uplink transmissions 612, 613 with the downlink transmissions 621, 624, the third transmission scheme 630 may have a "mixture" of different transmission widths and guard band widths (such as where the third transmission scheme 630 includes transmission widths and guard band widths associated with both the first transmission scheme 610 and the second transmission scheme 620).

In some aspects of the disclosure, the base station 105 may select the LBT threshold values 452 based on an estimated uplink-downlink leakage associated with a transmission scheme. For example, in some cases, RB sets associated with an uplink transmission may be adjacent to RB sets associated with a downlink transmission. In this case, energy leakage from the downlink to the uplink (or vice versa) may occur. To compensate for the energy leakage, the base station 105 may adjust LBT threshold values associated with the RB sets. For example, an uplink transmission that is adjacent to a downlink transmission may be associated with a different LBT threshold value (e.g., an increased LBT threshold value or a decreased LBT threshold value) to compensate for potential increased energy leakage that may increase an amount of detected energy, and another uplink transmission that is non-adjacent to any downlink transmission may be associated with a lower LBT threshold value (based on less potential energy leakage). In some implementations, an LBT threshold value for a downlink transmission that is adjacent to another downlink transmission can be adjusted by a particular value, such as a particular number of dBm. In another example, an LBT threshold value for a downlink transmission that is adjacent to another downlink transmission can be adjusted by a certain percentage.

To further illustrate, in some examples, the base station 105 determines the first LBT threshold value 454 based at least in part on whether the first frequency spectrum 410 is adjacent to a frequency spectrum scheduled for a downlink communication and determines the second LBT threshold value 456 based at least in part on whether the second frequency spectrum 420 is adjacent to a frequency spectrum scheduled for a downlink communication. In one example, one of the frequency spectrums 410, 420 is adjacent to a downlink frequency band, the other of the frequency spectrums 410, 420 is non-adjacent to a downlink frequency band, and the first LBT threshold value 454 is different than the second LBT threshold value 456.

One or more aspects described herein may improve performance of a wireless communication system. For example, by independently configuring the LBT threshold values 452, the LBT operation 450 may reflect dynamic conditions within the wireless communication system 400, such as whether or not the one or both of the frequency spectrums 410, 420 are adjacent to a downlink frequency band, which may be associated with leakage and which may affect results of the LBT operation 450 in some cases.

Figures 7, 8:
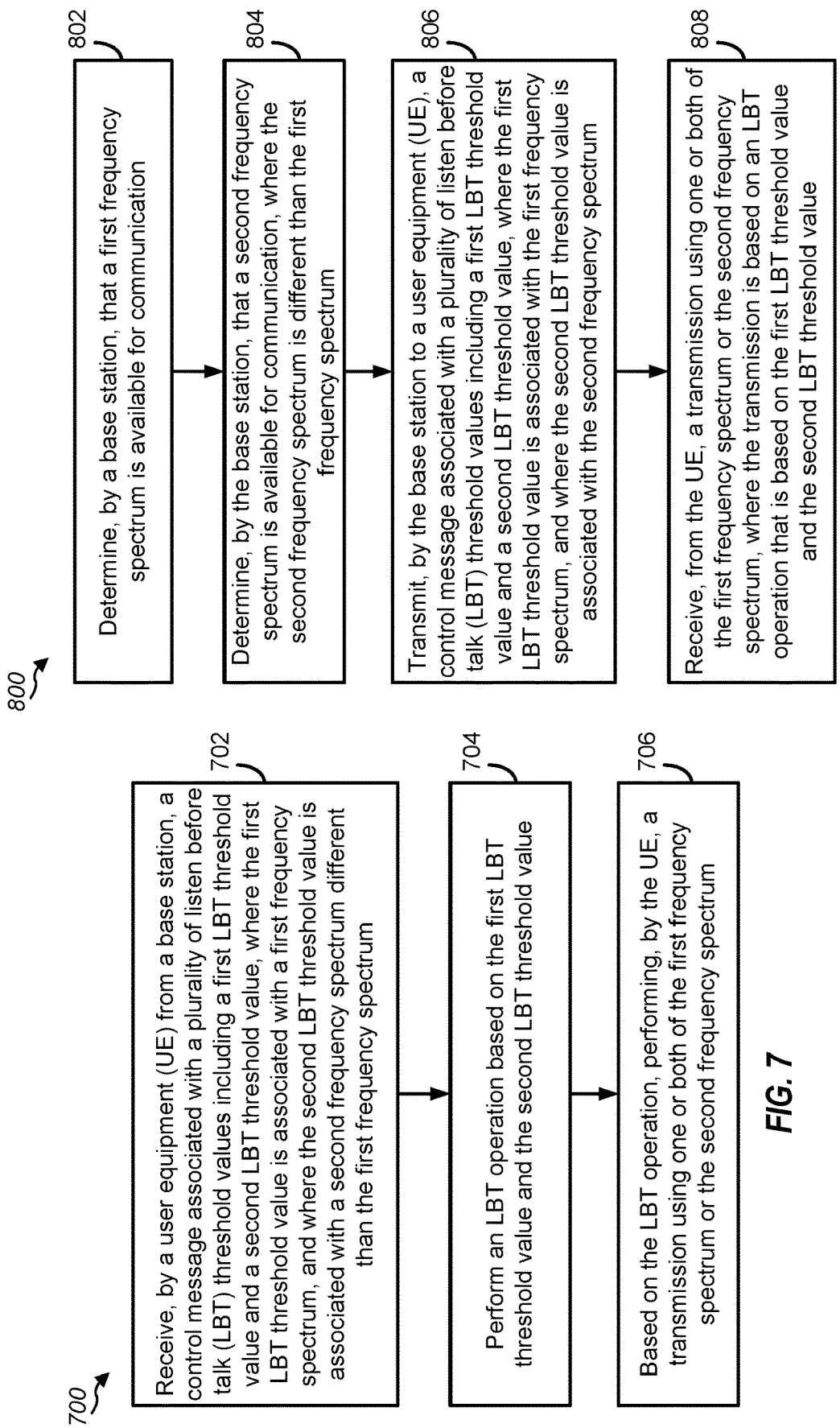
FIG. 7 is a flow chart of an example of a method of wireless communication that supports wireless communication using multiple LBT threshold values according to some aspects of the disclosure.
FIG. 8 is a flow chart of another example of a method of wireless communication that supports wireless communication using multiple LBT threshold values according to some aspects of the disclosure.

FIG. 7 is a flow chart illustrating an example of a method 700 of wireless communication that supports wireless communication using multiple LBT threshold values according to some aspects of the disclosure. In some examples, the method 700 is performed by a UE, such as by the UE 115.

The method 700 includes receiving, by a UE from a base station, a control message associated with a plurality of LBT threshold values including a first LBT threshold value and a second LBT threshold value, at 702. The first LBT threshold value is associated with a first frequency spectrum, and the second LBT threshold value is associated with a second frequency spectrum different than the first frequency spectrum. For example, the UE 115 may receive the control message 432 from the base station 105, and the control message may be associated with the LBT threshold values 454, 456. The first LBT threshold value 454 may be associated with the first frequency spectrum 410, and the second LBT threshold value 456 may be associated with the second frequency spectrum 420.

The method 700 further includes performing an LBT operation based on the first LBT threshold value and the second LBT threshold value, at 704. For example, the UE 115 may perform the LBT operation 450 based on the first LBT threshold value 454 and the second LBT threshold value 456.

The method 700 further includes, based on the LBT operation, performing, by the UE, a transmission using one or both of the first frequency spectrum or the second frequency spectrum, at 706. For example, the UE 115 may perform the transmission 436 using the first frequency spectrum 410, the second frequency spectrum 420, or both.

FIG. 8 is a flow chart illustrating an example of a method 800 of wireless communication that supports wireless communication using multiple LBT threshold values according to some aspects of the disclosure. In some examples, the method 800 is performed by a base station, such as by the base station 105.

The method 800 may include determining, by a base station, that a first frequency spectrum is available for communication, at 802. For example, the base station 105 may determine availability of the first frequency spectrum 410, such as based on a successful result of an LBT operation performed by the base station 105.

The method 800 may further include determining, by the base station, that a second frequency spectrum is available for communication, where the second frequency spectrum is different than the first frequency spectrum, at 804. For example, the base station 105 may determine availability of the second frequency spectrum 420, such as based on a successful result of an LBT operation performed by the base station 105.

The method 800 further includes transmitting, by the base station to a UE, a control message associated with a plurality of LBT threshold values including a first LBT threshold value and a second LBT threshold value, at 806. The first LBT threshold value is associated with the first frequency spectrum, and the second LBT threshold value is associated with the second frequency spectrum. For example, the base station 105 may transmit, to the UE 115, the control message 432 associated with the LBT threshold values 454, 456. The first LBT threshold value 454 may be associated with the first frequency spectrum 410, and the second LBT threshold value 456 may be associated with the second frequency spectrum 420.

The method 800 further includes receiving, from the UE, a transmission using one or both of the first frequency spectrum or the second frequency spectrum, at 808. The transmission is based on an LBT operation that is based on the first LBT threshold value and the second LBT threshold value. For example, the base station 105 may receive the transmission 436 using one or both of the first frequency spectrum 410 or the second frequency spectrum 420. The transmission 436 may be based on the LBT operation 450, and the LBT operation may be based on the first LBT threshold value 454 and the second LBT threshold value 456.

Figure 9:
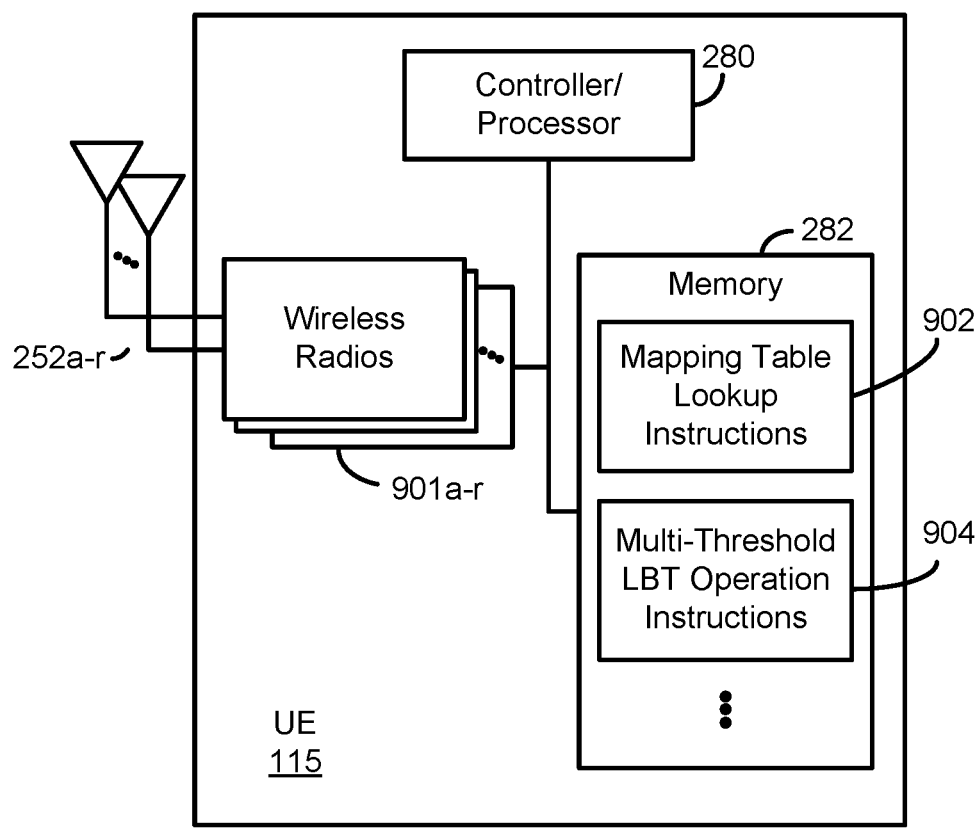
FIG. 9 is a block diagram illustrating an example of a UE that supports wireless communication using multiple LBT threshold values according to some aspects of the disclosure.

FIG. 9 is a block diagram illustrating an example of the UE 115 that supports wireless communication using multiple LBT threshold values according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 901a-r and antennas 252a-r. The wireless radios 901a-r may include one or more components or devices described herein, such as the modulator/demodulators 254a-r, the MIMO detector 256, the receive processor 258, the transmit processor 264, the TX MIMO processor 266, the transmitter 356, the receiver 358, one or more other components or devices, or a combination thereof.

In some examples, the controller/processor 280 executes mapping table lookup instructions 902 to perform a lookup operation to the mapping table 470 to determine multiple LBT threshold values 452 based on the control message 432 of FIG. 4. For example, the control message 432 may indicate an index value associated with the first row 471, an index associated with the second row 481, or an index value associated with a particular LBT threshold value (such as any of the index values 472, 474, 482, and 482). The controller/processor 280 may execute multi-threshold LBT operation instructions 904 to perform an LBT operation based on multiple LBT threshold values, such as to perform the LBT operation 450 based on the LBT threshold values 454, 456.

Figure 10:
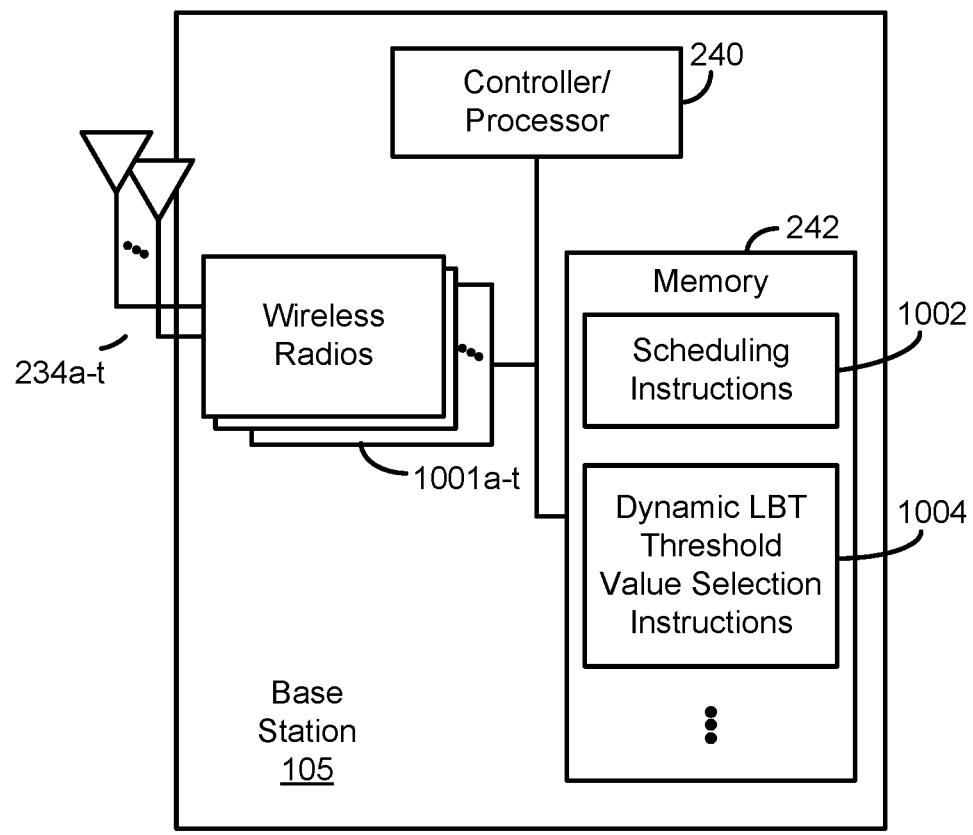
FIG. 10 is a block diagram illustrating an example of a base station that supports wireless communication using multiple LBT threshold values according to some aspects of the disclosure.

FIG. 10 is a block diagram illustrating an example of the base station 105 that supports wireless communication using multiple LBT threshold values according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 1001a-t and antennas 234a-t. The wireless radios 1001a-t may include one or more components or devices described herein, such as the modulator/demodulators 232a-t, the MIMO detector 236, the receive processor 238, the transmit processor 220, the TX MIMO processor 230, the transmitter 306, the receiver 308, one or more other components or devices, or a combination thereof.

In some examples, the controller/processor 240 executes scheduling instructions 1002 to schedule communication associated with the wireless communications system 400, such as to communications in accordance with the transmission schemes 600 of FIG. 6. The controller/processor 240 may execute dynamic LBT threshold value selection instructions 1004 to determine the LBT threshold values 452 and to transmit the control message 432 to indicate the LBT threshold values 452 to the UE 115.

According to some further aspects, in a first aspect, a method of wireless communication includes receiving, by a user equipment (UE) from a base station, a control message associated with a plurality of listen before talk (LBT) threshold values including a first LBT threshold value and a second LBT threshold value. The first LBT threshold value is associated with a first frequency spectrum, and the second LBT threshold value is associated with a second frequency spectrum different than the first frequency spectrum. The method further includes performing an LBT operation based on the first LBT threshold value and the second LBT threshold value. The method further includes, based on the LBT operation, performing a transmission by the UE using one or both of the first frequency spectrum or the second frequency spectrum.

In a second aspect alternatively or in addition to the first aspect, the first LBT threshold value is based at least in part on whether the first frequency spectrum is adjacent to a frequency spectrum scheduled for a downlink communication, and the second LBT threshold value is based at least in part on whether the second frequency spectrum is adjacent to a frequency spectrum scheduled for a downlink communication.

In a third aspect alternatively or in addition to any of the first through second aspects, one of the first frequency spectrum or the second frequency spectrum is adjacent to a downlink frequency band, the other of the first frequency spectrum or the second frequency spectrum is non-adjacent to a downlink frequency band, and the first LBT threshold value is different than the second LBT threshold value.

In a fourth aspect alternatively or in addition to any of the first through third aspects, the first frequency spectrum is associated with a first RB set, and the second frequency spectrum is associated with a second RB set different than the first RB set.

In a fifth aspect alternatively or in addition to any of the first through fourth aspects, the first frequency spectrum is associated with a first plurality of RB sets, and the second frequency spectrum is associated with a second plurality of RB sets different than the first plurality of RB sets.

In a sixth aspect alternatively or in addition to any of the first through fifth aspects, the base station and the UE operate based on a wireless communication protocol that specifies a mapping table of index values to LBT threshold values, and the method includes determining, by the UE based on the mapping table, the plurality of LBT threshold values based on a particular index value indicated by the control message.

In a seventh aspect alternatively or in addition to any of the first through sixth aspects, the plurality of LBT threshold values corresponds to a particular row of the mapping table.

In an eighth aspect alternatively or in addition to any of the first through seventh aspects, the method includes receiving a configuration message configuring the UE with a mapping table of index values to LBT threshold values and determining, by the UE based on the mapping table, the plurality of LBT threshold values based on a particular index value indicated by the control message.

In a ninth aspect alternatively or in addition to any of the first through eighth aspects, the configuration message has a radio resource control (RRC) format.

In a tenth aspect alternatively or in addition to any of the first through ninth aspects, the control message includes a first index value indicating the first LBT threshold value and further includes a second index value indicating the second LBT threshold value.

In an eleventh aspect alternatively or in addition to any of the first through tenth aspects, the method further includes accessing, by the UE, a mapping table to determine the first LBT threshold value based on the first index value to and determine the second LBT threshold value based on the second index value.

In a twelfth aspect alternatively or in addition to any of the first through tenth aspects, the first index value includes a first number of bits, and the second index value includes a second number of bits.

In a thirteenth aspect alternatively or in addition to any of the first through twelfth aspects, the first number of bits indicates a first resolution associated with the first LBT threshold value, and the second number of bits indicates a second resolution associated with the second LBT threshold value.

In a fourteenth aspect alternatively or in addition to any of the first through thirteenth aspects, the control message has one of a downlink control information (DCI) 2_0 format, a radio resource control (RRC) format, or a medium access control (MAC) control element (MAC-CE) format.

In a fifteenth aspect alternatively or in addition to any of the first through fourteenth aspects, the first LBT threshold value is different than the second LBT threshold value, and wherein performing the transmission includes transmitting an uplink signal using both the first frequency spectrum and the second frequency spectrum.

In a sixteenth aspect alternatively or in addition to any of the first through fifteenth aspects, performing the LBT operation includes determining a first energy value associated with the first frequency spectrum and a second energy value associated with the second frequency spectrum, and the method includes determining success of the LBT operation based on detecting that the first energy value fails to satisfy the first LBT threshold value and that the second energy value fails to satisfy the second LBT threshold value.

In a seventeenth aspect alternatively or in addition to any of the first through sixteenth aspects, the method includes determining, by the UE, a composite LBT threshold value based on the plurality of LBT threshold values.

In an eighteenth aspect alternatively or in addition to any of the first through seventeenth aspects, the method includes determining the composite LBT threshold value includes identifying a maximum value of the plurality of LBT threshold values and selecting the maximum value as the composite LBT threshold value.

In a nineteenth aspect alternatively or in addition to any of the first through eighteenth aspects, determining the composite LBT threshold value includes identifying a minimum value of the plurality of LBT threshold values and selecting the minimum value as the composite LBT threshold value.

In a twentieth aspect alternatively or in addition to any of the first through nineteenth aspects, the composite LBT threshold value corresponds to an average of the plurality of LBT threshold values.

In a twenty-first aspect alternatively or in addition to any of the first through twentieth aspects, determining the composite LBT threshold value includes performing one or more operations based on a particular function of the plurality of LBT threshold values.

In a twenty-second aspect alternatively or in addition to any of the first through twenty-first aspects, the composite LBT threshold value corresponds to a predetermined LBT threshold value that is reserved for LBT operations associated with multiple different LBT threshold values.

In a twenty-third aspect alternatively or in addition to any of the first through twenty-second aspects, a non-transitory computer-readable medium stores instructions executable by a processor to perform operations. The operations include receiving, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The operations further include performing an LBT operation based on the first LBT threshold value and the second LBT threshold value. The operations further include, based on the LBT operation, initiating a transmission using one or both of the first frequency spectrum or the second frequency spectrum.

In a twenty-fourth aspect alternatively or in addition to any of the first through twenty-third aspects, an apparatus includes a memory and one or more processors coupled to the memory. The one or more processors are configured to receive, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The one or more processors are further configured to perform an LBT operation based on the first LBT threshold value and the second LBT threshold value and to initiate, based on the LBT operation, a transmission using one or both of the first frequency spectrum or the second frequency spectrum.

In a twenty-fifth aspect alternatively or in addition to any of the first through twenty-fourth aspects, an apparatus includes means for receiving, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes means for performing an LBT operation based on the first LBT threshold value and the second LBT threshold value and means for performing, based on the LBT operation, a transmission using one or both of the first frequency spectrum or the second frequency spectrum.

In a twenty-sixth aspect alternatively or in addition to any of the first through twenty-fifth aspects, a method of wireless communication includes determining, by a base station, that a first frequency spectrum is available for communication. The method further includes determining, by the base station, that a second frequency spectrum is available for communication. The second frequency spectrum is different than the first frequency spectrum. The method further includes transmitting, by the base station to a UE, a control message associated with a plurality of LBT threshold values including a first LBT threshold value and a second LBT threshold value. The first LBT threshold value is associated with the first frequency spectrum, and the second LBT threshold value is associated with the second frequency spectrum.

In a twenty-seventh aspect alternatively or in addition to any of the first through twenty-sixth aspects, the method includes determining the first LBT threshold value based at least in part on whether the first frequency spectrum is adjacent to a frequency spectrum scheduled for a downlink communication and further includes determining the second LBT threshold value based at least in part on whether the second frequency spectrum is adjacent to a frequency spectrum scheduled for a downlink communication.

In a twenty-eighth aspect alternatively or in addition to any of the first through twenty-seventh aspects, one of the first frequency spectrum or the second frequency spectrum is adjacent to a downlink frequency band, the other of the first frequency spectrum or the second frequency spectrum is non-adjacent to a downlink frequency band, and the first LBT threshold value is different than the second LBT threshold value.

In a twenty-ninth aspect alternatively or in addition to any of the first through twenty-eighth aspects, the method includes determining, by the base station, that a third frequency spectrum is unavailable for communication, and the plurality of LBT threshold values excludes any LBT threshold value associated with the third frequency spectrum.

In a thirtieth aspect alternatively or in addition to any of the first through twenty-ninth aspects, the base station and the UE operate based on a wireless communication protocol that specifies a mapping table of index values to LBT threshold values, and the UE determines, based on the mapping table, the plurality of LBT threshold values based on a particular index value indicated by the control message.

In a thirty-first aspect alternatively or in addition to any of the first through thirtieth aspects, the plurality of LBT threshold values corresponds to a particular row of the mapping table.

In a thirty-second aspect alternatively or in addition to any of the first through thirty-first aspects, the method includes transmitting a configuration message configuring the UE with a mapping table of index values to LBT threshold values, and the UE determines, based on the mapping table, the plurality of LBT threshold values based on a particular index value indicated by the control message.

In a thirty-third aspect alternatively or in addition to any of the first through thirty-second aspects, the configuration message has a radio resource control (RRC) format.

In a thirty-fourth aspect alternatively or in addition to any of the first through thirty-third aspects, the control message includes a first index value indicating the first LBT threshold value and further includes a second index value indicating the second LBT threshold value.

In a thirty-fifth aspect alternatively or in addition to any of the first through thirty-fourth aspects, the UE accesses a mapping table to determine the first LBT threshold value based on the first index value to and determine the second LBT threshold value based on the second index value.

In a thirty-sixth aspect alternatively or in addition to any of the first through thirty-fifth aspects, the first index value includes a first number of bits, and the second index value includes a second number of bits.

In a thirty-seventh aspect alternatively or in addition to any of the first through thirty-sixth aspects, the first number of bits indicates a first resolution associated with the first LBT threshold value, and the second number of bits indicates a second resolution associated with the second LBT threshold value.

In a thirty-eighth aspect alternatively or in addition to any of the first through thirty-seventh aspects, the control message has one of a downlink control information (DCI) 2_0 format, a radio resource control (RRC) format, or a medium access control (MAC) control element (MAC-CE) format.

In a thirty-ninth aspect alternatively or in addition to any of the first through thirty-eighth aspects, a non-transitory computer-readable medium stores instructions executable by a processor to perform operations. The operations include determining that a first frequency spectrum is available for communication and determining that a second frequency spectrum is available for communication. The second frequency spectrum is different than the first frequency spectrum. The operations further include initiating transmission, to a UE, of a control message associated with a plurality of LBT threshold values including a first LBT threshold value and a second LBT threshold value. The first LBT threshold value is associated with the first frequency spectrum, and the second LBT threshold value is associated with the second frequency spectrum.

In a fortieth aspect alternatively or in addition to any of the first through thirty-ninth aspects, an apparatus includes a memory and one or more processors coupled to the memory. The one or more processors are configured to determine that a first frequency spectrum is available for communication and to determine that a second frequency spectrum is available for communication. The second frequency spectrum is different than the first frequency spectrum. The one or more processors are further configured to initiate transmission, to a UE, of a control message associated with a plurality of LBT threshold values including a first LBT threshold value and a second LBT threshold value. The first LBT threshold value is associated with the first frequency spectrum, and the second LBT threshold value is associated with the second frequency spectrum.

In a forty-first aspect alternatively or in addition to any of the first through fortieth aspects, an apparatus includes means for determining that a first frequency spectrum is available for communication and for determining that a second frequency spectrum is available for communication, wherein the second frequency spectrum is different than the first frequency spectrum. The apparatus further includes means for transmitting, a UE, a control message associated with a plurality of LBT threshold values including a first LBT threshold value and a second LBT threshold value. The first LBT threshold value is associated with the first frequency spectrum, and the second LBT threshold value is associated with the second frequency spectrum.

In a forty-second aspect alternatively or in addition to one or more of the first through forty-first aspects, an apparatus includes a receiver configured to receive, from a base station, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes a transmitter configured to initiate a transmission using one or both of the first frequency spectrum or the second frequency spectrum. The transmission is based on an LBT operation that is based on the first LBT threshold value and the second LBT threshold value.

In a forty-third aspect alternatively or in addition to one or more of the first through forty-second aspects, the configuration message has a radio resource control (RRC) format, and the control message has one of a downlink control information (DCI) 2_0 format, an RRC format, or a medium access control (MAC) control element (MAC-CE) format.

In a forty-fourth aspect alternatively or in addition to one or more of the first through forty-third aspects, the control message includes a first index value indicating the first LBT threshold value and further includes a second index value indicating the second LBT threshold value, and the apparatus includes a memory configured to store a mapping table indicating the first LBT threshold value, the first index value, the second LBT threshold value, and the second index value.

In a forty-fifth aspect alternatively or in addition to one or more of the first through forty-fifth aspects, the first index value includes a first number of bits indicating a first resolution associated with the first LBT threshold value, and the second index value includes a second number of bits indicating a second resolution associated with the second LBT threshold value.

In a forty-sixth aspect alternatively or in addition to one or more of the first through forty-fifth aspects, a method of wireless communication includes transmitting, by a base station to a UE, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The method further includes receiving, from the UE, a transmission using one or both of the first frequency spectrum or the second frequency spectrum. The transmission is based on an LBT operation that is based on the first LBT threshold value and the second LBT threshold value.

In a forty-seventh aspect alternatively or in addition to one or more of the first through forty-sixth aspects, the method includes determining the first LBT threshold value based at least in part on whether the first frequency spectrum is adjacent to a frequency spectrum scheduled for a downlink communication and further includes determining the second LBT threshold value based at least in part on whether the second frequency spectrum is adjacent to a frequency spectrum scheduled for a downlink communication.

In a forty-eighth aspect alternatively or in addition to one or more of the first through forty-seventh aspects, one of the first frequency spectrum or the second frequency spectrum is adjacent to a downlink frequency band, the other of the first frequency spectrum or the second frequency spectrum is non-adjacent to a downlink frequency band, and the first LBT threshold value is different than the second LBT threshold value.

In a forty-ninth aspect alternatively or in addition to one or more of the first through forty-eighth aspects, the method includes determining, by the base station, that a third frequency spectrum is unavailable for communication, wherein the plurality of LBT threshold values excludes any LBT threshold value associated with the third frequency spectrum.

In a fiftieth aspect alternatively or in addition to one or more of the first through forty-ninth aspects, the base station and the UE operate based on a wireless communication protocol that specifies a mapping table of index values to LBT threshold values, and the UE determines, based on the mapping table, the plurality of LBT threshold values based on a particular index value indicated by the control message.

In a fifty-first aspect alternatively or in addition to one or more of the first through fiftieth aspects, the plurality of LBT threshold values corresponds to a particular row of the mapping table.

In a fifty-second aspect alternatively or in addition to one or more of the first through fifty-first aspects, an apparatus includes a transmitter configured to transmit, to a UE, a control message associated with a plurality of LBT threshold values including a first LBT threshold value and a second LBT threshold value. The first LBT threshold value is associated with a first frequency spectrum, and the second LBT threshold value is associated with a second frequency spectrum different than the first frequency spectrum. The apparatus further includes a receiver configured to receive, from the UE, a transmission using one or both of the first frequency spectrum or the second frequency spectrum. The transmission is based on an LBT operation that is based on the first LBT threshold value and the second LBT threshold value.

In a fifty-third aspect alternatively or in addition to one or more of the first through fifty-second aspects, the transmitter is further configured to transmit a configuration message configuring the UE with a mapping table of index values to LBT threshold values, and the UE determines, based on the mapping table, the plurality of LBT threshold values based on a particular index value indicated by the control message.

In a fifty-fourth aspect alternatively or in addition to one or more of the first through fifty-third aspects, the control message includes a first index value indicating the first LBT threshold value and further includes a second index value indicating the second LBT threshold value.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The functional blocks and operations described herein may be implemented using one or more processors, electronics devices, hardware devices, electronics components, logical circuits, memories, software codes, firmware codes, etc., or any combination thereof.

Those of skill would further appreciate that the various illustrative logical blocks, devices, circuits, and operations described herein may be implemented using electronic hardware, computer software, or combinations of both. To illustrate, various components, blocks, devices, circuits, and operations have been described above generally in terms of their functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions that are described herein are merely examples and that the components, methods, or interactions of the various aspects of the disclosure may be combined or performed in ways other than those illustrated and described herein.

The various illustrative logical blocks, devices, and circuits described herein may be implemented or performed using a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, but in the alternative, the processor may be any other processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method, comprising:
receiving, from a base station, a control message associated with a plurality of listen before talk (LBT) threshold values including a first LBT threshold value and a second LBT threshold value, the first LBT threshold value associated with a first frequency spectrum, the second LBT threshold value associated with a second frequency spectrum different than the first frequency spectrum, and the first LBT threshold value in accordance with a first scheduled communication type associated with a third frequency spectrum that is adjacent to the first frequency spectrum;

performing an LBT operation in accordance with the first LBT threshold value and the second LBT threshold value; and performing, in accordance with the LBT operation, a transmission using one or both of the first frequency spectrum or the second frequency spectrum.

2. The method of claim 1, wherein the first scheduled communication type indicates whether the third frequency spectrum is scheduled for a first downlink communication, and wherein the second LBT threshold value is based at least in part on a second scheduled communication type associated with a fourth frequency spectrum that is adjacent to the second frequency spectrum, the second scheduled communication type indicating whether the fourth frequency spectrum is scheduled for a second downlink communication.

3. The method of claim 1, wherein one of the first frequency spectrum or the second frequency spectrum is adjacent to a downlink frequency band, wherein the other of the first frequency spectrum or the second frequency spectrum is non-adjacent to a downlink frequency band, and wherein the first LBT threshold value is different than the second LBT threshold value.

4. The method of claim 1, wherein the first frequency spectrum is associated with a first resource block (RB) set, and wherein the second frequency spectrum is associated with a second RB set different than the first RB set.

5. The method of claim 1, wherein the first frequency spectrum is associated with a first plurality of resource block (RB) sets, and wherein the second frequency spectrum is associated with a second plurality of RB sets different than the first plurality of RB sets.

6. The method of claim 1, wherein the base station and the UE operate based on a wireless communication protocol that specifies a mapping table of index values to LBT threshold values, and further comprising determining, by the UE based on the mapping table, the plurality of LBT threshold values based on a particular index value indicated by the control message.

7. The method of claim 6, wherein the plurality of LBT threshold values corresponds to a particular row of the mapping table.

8. The method of claim 1, further comprising:
receiving a configuration message configuring the UE with a mapping table of index values to LBT threshold values; and
determining, by the UE based on the mapping table, the plurality of LBT threshold values based on a particular index value indicated by the control message.

9. The method of claim 1, wherein the first LBT threshold value is different than the second LBT threshold value, and wherein performing the transmission includes transmitting an uplink signal using both the first frequency spectrum and the second frequency spectrum.

10. The method of claim 9, wherein performing the LBT operation includes determining a first energy value associated with the first frequency spectrum and a second energy value associated with the second frequency spectrum, and further comprising determining success of the LBT operation based on detecting that the first energy value fails to satisfy the first LBT threshold value and that the second energy value fails to satisfy the second LBT threshold value.

11. The method of claim 9, further comprising determining, by the UE, a composite LBT threshold value based on the plurality of LBT threshold values.

12. The method of claim 11, wherein determining the composite LBT threshold value includes identifying a maximum value of the plurality of LBT threshold values and selecting the maximum value as the composite LBT threshold value.

13. The method of claim 11, wherein determining the composite LBT threshold value includes identifying a minimum value of the plurality of LBT threshold values and selecting the minimum value as the composite LBT threshold value.

14. The method of claim 11, wherein the composite LBT threshold value corresponds to an average of the plurality of LBT threshold values.

15. The method of claim 11, wherein determining the composite LBT threshold value includes performing one or more operations based on a particular function of the plurality of LBT threshold values.

16. The method of claim 11, wherein the composite LBT threshold value corresponds to a predetermined LBT threshold value that is reserved for LBT operations associated with multiple different LBT threshold values.

17. An apparatus for communication by a user equipment (UE), the apparatus comprising:
a receiver configured to receive, from a base station, a control message associated with a plurality of listen before talk (LBT) threshold values including a first LBT threshold value and a second LBT threshold value, the first LBT threshold value associated with a first frequency spectrum, the second LBT threshold value associated with a second frequency spectrum different than the first frequency spectrum, and the first LBT threshold value in accordance with a first scheduled communication type associated with a third frequency spectrum that is adjacent to the first frequency spectrum; and
a transmitter configured to initiate a transmission using one or both of the first frequency spectrum or the second frequency spectrum, the transmission in accordance with an LBT operation that is in accordance with the first LBT threshold value and the second LBT threshold value.

18. The apparatus of claim 17, wherein the control message has one of a downlink control information (DCI) 2_0 format, an RRC format, or a medium access control (MAC) control element (MAC-CE) format.

19. The apparatus of claim 17, wherein the control message includes a first index value indicating the first LBT threshold value and further includes a second index value indicating the second LBT threshold value.

20. The apparatus of claim 19, further comprising a memory configured to store a mapping table indicating the first LBT threshold value, the first index value, the second LBT threshold value, and the second index value.

21. The apparatus of claim 19, wherein the first index value includes a first number of bits indicating a first resolution associated with the first LBT threshold value, and wherein the second index value includes a second number of bits indicating a second resolution associated with the second LBT threshold value.

22. A method of wireless communication, the method comprising:
transmitting, by a base station to a user equipment (UE), a control message associated with a plurality of listen before talk (LBT) threshold values including a first LBT threshold value and a second LBT threshold value, the first LBT threshold value associated with a first frequency spectrum, the second LBT threshold value associated with a second frequency spectrum different than the first frequency spectrum, and the first LBT threshold value in accordance with a first scheduled communication type associated with a third frequency spectrum that is adjacent to the first frequency spectrum; and receiving, from the UE, a transmission using one or both of the first frequency spectrum or the second frequency spectrum, the transmission in accordance with an LBT operation that is in accordance with the first LBT threshold value and the second LBT threshold value.

23. The method of claim 22, further comprising:
determining the first LBT threshold value in accordance with the first scheduled communication type, the first scheduled communication type indicating whether the third frequency spectrum is scheduled for a first downlink communication; and
determining the second LBT threshold value in accordance with a second scheduled communication type, the second scheduled communication type indicating whether a fourth frequency spectrum that is adjacent to the second frequency spectrum is scheduled for a second downlink communication.

24. The method of claim 22, wherein one of the first frequency spectrum or the second frequency spectrum is adjacent to a downlink frequency band, wherein the other of the first frequency spectrum or the second frequency spectrum is non-adjacent to a downlink frequency band, and wherein the first LBT threshold value is different than the second LBT threshold value.

25. The method of claim 22, further comprising determining, by the base station, that at least one other frequency spectrum is unavailable for communication, wherein the plurality of LBT threshold values excludes any LBT threshold value associated with the at least one other frequency spectrum.

26. The method of claim 22, wherein the base station and the UE operate based on a wireless communication protocol that specifies a mapping table of index values to LBT threshold values, and wherein the UE determines, based on the mapping table, the plurality of LBT threshold values based on a particular index value indicated by the control message.

27. The method of claim 26, wherein the plurality of LBT threshold values corresponds to a particular row of the mapping table.

28. An apparatus comprising:
a transmitter configured to transmit, to a user equipment (UE), a control message associated with a plurality of listen before talk (LBT) threshold values including a first LBT threshold value and a second LBT threshold value, the first LBT threshold value associated with a first frequency spectrum, the second LBT threshold value associated with a second frequency spectrum different than the first frequency spectrum, and the first LBT threshold value in accordance with a first scheduled communication type associated with a third frequency spectrum that is adjacent to the first frequency spectrum; and
a receiver configured to receive, from the UE, a transmission using one or both of the first frequency spectrum or the second frequency spectrum, the transmission in accordance with an LBT operation that is in accordance with the first LBT threshold value and the second LBT threshold value.

29. The apparatus of claim 28, wherein the transmitter is further configured to transmit a configuration message configuring the UE with a mapping table of index values to LBT threshold values, and wherein the UE determines, based on the mapping table, the plurality of LBT threshold values based on a particular index value indicated by the control message.

30. The apparatus of claim 28, wherein the control message includes a first index value indicating the first LBT threshold value and further includes a second index value indicating the second LBT threshold value.

\* \* \* \* \*